US012583668B1

(12) United States Patent
Konopacky

(10) Patent No.: US 12,583,668 B1
(45) Date of Patent: Mar. 24, 2026

(54) RECEPTACLE TRANSPORT APPARATUS

(71) Applicant: William Konopacky, Stevens Point, WI (US)

(72) Inventor: William Konopacky, Stevens Point, WI (US)

( * ) Notice: Subject to any disclaimer, the term of this patent is extended or adjusted under 35 U.S.C. 154(b) by 46 days.

(21) Appl. No.: 18/525,337

(22) Filed: Nov. 30, 2023

Related U.S. Application Data

(60) Provisional application No. 63/428,863, filed on Nov. 30, 2022.

(51) Int. Cl.
*B65F 1/14* (2006.01)

(52) U.S. Cl.
CPC .................................. *B65F 1/1468* (2013.01)

(58) Field of Classification Search
CPC .......... A47J 47/18; A47J 33/00; A47J 45/071; B65D 23/106; B65D 25/32; B65D 25/28; Y10T 16/4707; Y10T 16/44; B65F 1/122; B65F 1/1468
USPC ......................... 220/756, 762, 759; 74/551.8
See application file for complete search history.

(56) References Cited

U.S. PATENT DOCUMENTS 2,444,447 A * 7/1948 Winsor .............. B65D 25/2844 16/110.1
4,874,109 A * 10/1989 Cook ................. A47G 23/0266 215/396
8,141,455 B2 3/2012 Ogburn
8,430,267 B2 4/2013 Kilduff et al.
8,757,428 B2 6/2014 Daudelin
9,365,346 B2 6/2016 McDade et al.
9,415,901 B2 * 8/2016 Beckman .............. A47J 45/067
11,254,497 B2 2/2022 Nolet et al.
2010/0230427 A1 9/2010 Parker et al.
2019/0300280 A1 10/2019 Peek et al.

* cited by examiner

*Primary Examiner* — King M Chu
(74) *Attorney, Agent, or Firm* — John Rizvi; John Rizvi, P.A.—The Patent Professor ®

(57) ABSTRACT

A receptacle transport apparatus which is suitable for enhancing mobility of a trash receptacle, recycling receptacle or other type of receptacle on a surface may include a receptacle engaging frame. The receptacle engaging frame may be configured for detachable engagement with the receptacle. A handle assembly may extend from the receptacle engaging frame. The handle assembly may be graspable by a mover of the receptacle to enable the mover to push or pull the receptacle along a driveway, street, floor, or other surface. Accordingly, in an exemplary application, the receptacle engaging frame can be placed into engagement with the receptacle. The handle assembly may extend forwardly from the receptacle engaging frame. The handle assembly may be grasped by the mover of the receptacle to push or pull the receptacle along the surface. After use, the receptacle engaging frame may be disengaged from the receptacle for storage. The receptacle transport apparatus may be selectively collapsible to facilitate space-efficient storage.

20 Claims, 8 Drawing Sheets

RECEPTACLE TRANSPORT APPARATUS

CROSS-REFERENCE TO RELATED APPLICATIONS

This application claims the benefit of U.S. Provisional Patent Application Ser. No. 63/428,863, filed on Nov. 30, 2022, which is incorporated by reference herein in its entirety.

FIELD OF THE INVENTION

The present invention relates generally to receptacles, and more particularly, to a receptacle transport apparatus which is suitable for enhancing mobility of a trash receptacle, recycling receptacle or the like on a surface.

BACKGROUND OF THE INVENTION

Receptacles for containing and transporting trash, garbage, recyclable items and materials and other types of materials are widely used around the world. One type of commonly used receptacle for containing and transporting trash includes a large receptacle or bin having an interior volume suitable for receiving trash. A pair of wheels is provided at the bottom rear edge of the receptacle. A lid is typically connected to the container via a hinge. A handle typically extends from the hinge above the wheels to enable a user of the receptacle to push or pull the receptacle. The user transports the receptacle by leaning the receptacle back on the wheels while grasping the handle, and then pushing or pulling the receptacle as the receptacle continues to roll on the wheels.

One of the challenges of moving a conventional trash receptacle, particularly if it is loaded with a large quantity of trash which renders the receptacle heavy, is that of balancing the receptacle on the wheels while pushing or pulling the receptacle. Some persons may encounter difficulty in maintaining the center of gravity of the receptacle on the wheels of the receptacle. In some cases, the weight of the receptacle may cause the handle to be pulled from the grip of the user. This may render the trash receptacle to become more unstable, particularly on a sloped driveway or other surface, and turn over, thus spilling the trash from the receptacle onto the surface.

Accordingly, there is need for a receptacle transport apparatus which is suitable for enhancing mobility of a trash receptacle, recycling receptacle or the like on a surface.

SUMMARY OF THE INVENTION

The present invention is directed to a receptacle transport apparatus which is suitable for enhancing mobility of a trash receptacle, recycling receptacle or other type of receptacle on a surface. The receptacle support apparatus may include a receptacle engaging frame. The receptacle engaging frame may be configured for detachable engagement with the receptacle. A handle assembly may extend from the receptacle engaging frame. The handle assembly may be graspable by a mover of the receptacle to enable the mover to push or pull the receptacle along a driveway, street, floor, or other surface. Accordingly, in an exemplary application, the receptacle engaging frame can be placed into engagement with the receptacle. The handle assembly may extend forwardly from the receptacle engaging frame. The handle assembly may be grasped by the mover of the receptacle to push or pull the receptacle along the surface. After use, the receptacle engaging frame may be disengaged from the receptacle for storage. The receptacle transport apparatus may be selectively collapsible to facilitate space-efficient storage.

In an illustrative implementation of the invention, a receptacle transport apparatus which is suitable for enhancing mobility of a trash receptacle, recycling receptacle or other type of receptacle on a surface may include a receptacle engaging frame. The receptacle engaging frame may be configured for detachable engagement with the receptacle. A handle assembly may extend from the receptacle engaging frame. The handle assembly may be graspable by a mover of the receptacle to enable the mover to push or pull the receptacle along a driveway, street, floor, or other surface. An arm stabilizer may extend between the receptacle engaging frame and the handle assembly to stabilize the handle assembly with respect to the receptacle engaging frame. Accordingly, in an exemplary application, the receptacle engaging frame can be placed into engagement with the receptacle. The handle assembly may extend forwardly from the receptacle engaging frame. The handle assembly may be grasped by the mover of the receptacle to push or pull the receptacle along the surface. After use, the receptacle engaging frame may be disengaged from the receptacle for storage. The handle assembly may be removable from the receptacle engaging frame and the arm stabilizer foldable against the receptacle engaging frame to facilitate space-efficient storage of the receptacle transport apparatus.

In a second aspect, a rear receptacle engaging member and a front receptacle engaging member may be provided on the receptacle engaging frame. The rear receptacle engaging member and the front receptacle engaging member may be configured to engage a receptacle hoisting member on the receptacle.

In another aspect, the receptacle engaging frame may include at least one receptacle engaging prong configured to engage the receptacle.

In another aspect, the receptacle engaging prong may include a pair of spaced-apart receptacle engaging prongs.

In another aspect, the receptacle engaging prongs may be selectively positional on the receptacle engaging frame to accommodate receptacles of various types and sizes.

In another aspect, the receptacle engaging frame may include a frame base. A pair of parallel, spaced-apart, upstanding side frame members may extend from the frame base. A frame arm connector may extend between the side frame members.

In another aspect, the frame arm connector may include a pair of frame arm connector fittings which receive the respective side frame members of the receptacle engaging frame and a frame arm connector member extending between the frame arm connector fittings.

In another aspect, the front receptacle engaging member may extend downwardly from the frame arm connector member of the frame arm connector.

In another aspect, the receptacle engaging prongs may be mounted on a prong carriage which is adjustably mounted on the side frame members of the receptacle engaging frame.

In another aspect, the prong carriage may include a pair of carriage fittings which receive the respective side frame members of the receptacle engaging frame and a carriage member extending between the carriage fittings. The receptacle engaging prongs may extend from the carriage member.

In another aspect, the rear receptacle engaging member may extend upwardly from the frame base.

In another aspect, the prong carriage may be adjustably mounted on the side frame members between the frame base and the frame arm connector.

In another aspect, an engaging member opening may be provided in the carriage member. The front receptacle engaging member may extend through the engaging member opening.

In another aspect, a frame arm connector may extend between the side frame members of the receptacle engaging frame. The front receptacle engaging member may extend from the frame arm connector.

In another aspect, a plurality of pin openings may be provided in the front receptacle engaging member. A member adjusting pin may be extended through one of the pin openings in the front receptacle engaging member and through a registering pin opening in the carriage member of the prong carriage to secure the prong carriage at the desired position on the receptacle engaging frame.

In another aspect, the arm stabilizer may be selectively extendable between the handle assembly and the frame base of the receptacle engaging frame.

In another aspect, the frame base of the receptacle engaging frame may include a center frame member. The side frame members may extend from the center frame member of the frame base.

In another aspect, the rear receptacle engaging member may extend from the frame base.

In another aspect, the center frame member of the frame base may include multiple base member arms. The side frame members, the rear receptacle engaging member and the arm stabilizer may be attached to the respective base member arms of the center frame member.

In another aspect, a pair of side base member elbows may connect the side frame members to a respective pair of the base member arms of the center frame member.

In another aspect, a rear base member elbow and a front base member elbow may connect the respective rear receptacle engaging member and arm stabilizer to a respective pair of the base member arms of the center frame member.

In another aspect, a handle connector may extend between the side frame members of the receptacle engaging frame. The handle connector may facilitate attachment of the handle assembly to the receptacle engaging frame.

In another aspect, the handle connector may include a pair of handle connector fittings which receive the respective side frame members of the receptacle engaging frame. A tee-shaped handle connecting member may extend between the handle connector fittings. The handle assembly may be detachably connectible to the handle connecting member.

In another aspect, the arm stabilizer may be selectively deployable in a functional configuration to support the handle assembly in the extended configuration with respect to the receptacle engaging frame and in a collapsed configuration to fit against the receptacle engaging frame for space-efficient storage of the receptacle transport apparatus.

In another aspect, the handle connecting member may be rotatably mounted with respect to the handle connector fittings of the handle connector. The handle connecting member may be selectively deployable in a functional position to support the handle assembly in the extended configuration with respect to the receptacle engaging frame. The handle connecting member may be selectively deployable in a folded position to engage and support the arm stabilizer in the collapsed configuration for storage.

In another aspect, a handle connecting arm may extend from the handle connecting member. The handle assembly may be configured to detachably engage the handle connecting arm.

In another aspect, the handle assembly may include an elongated handle assembly arm. An arm connector may terminate a proximal end of the handle assembly arm. The arm connector may be configured for detachable attachment to the handle connecting arm which extends from the handle connecting member of the handle connector. A handle may terminate a distal end of the handle assembly arm.

In another aspect, a release button may be provided on the arm connector. The release button may facilitate selective detachment of the arm connector from the handle connecting arm.

In another aspect, the arm stabilizer may include an elongated stabilizing member. A proximal end of the stabilizing member may be connected to the front base member elbow which extends from the corresponding base member arm of the center frame member. A distal end of the stabilizing member may be configured for attachment to the handle assembly arm of the handle assembly.

In another aspect, a stabilizing member elbow may terminate the distal end of the stabilizing member of the arm stabilizer. A stabilizing member connector may be provided on the handle assembly arm of the handle assembly. The stabilizing member elbow may be configured for detachable attachment to the stabilizing member connector to facilitate deployment of the arm stabilizer in an extended, functional position to support the handle assembly in an extended configuration with respect to the receptacle engaging frame and in the collapsed configuration for storage.

In another aspect, an arm stabilizer pin may detachably attach the stabilizing member elbow to the stabilizing member connector.

In another aspect, a stabilizing member fitting may be provided on the stabilizing member of the arm stabilizer. The stabilizing member fitting may be configured to engage the handle connecting member of the handle connector to secure the arm stabilizer in the collapsed configuration for storage. The arm stabilizer pin may facilitate attachment of the stabilizing member fitting to the handle connecting member in the collapsed configuration.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
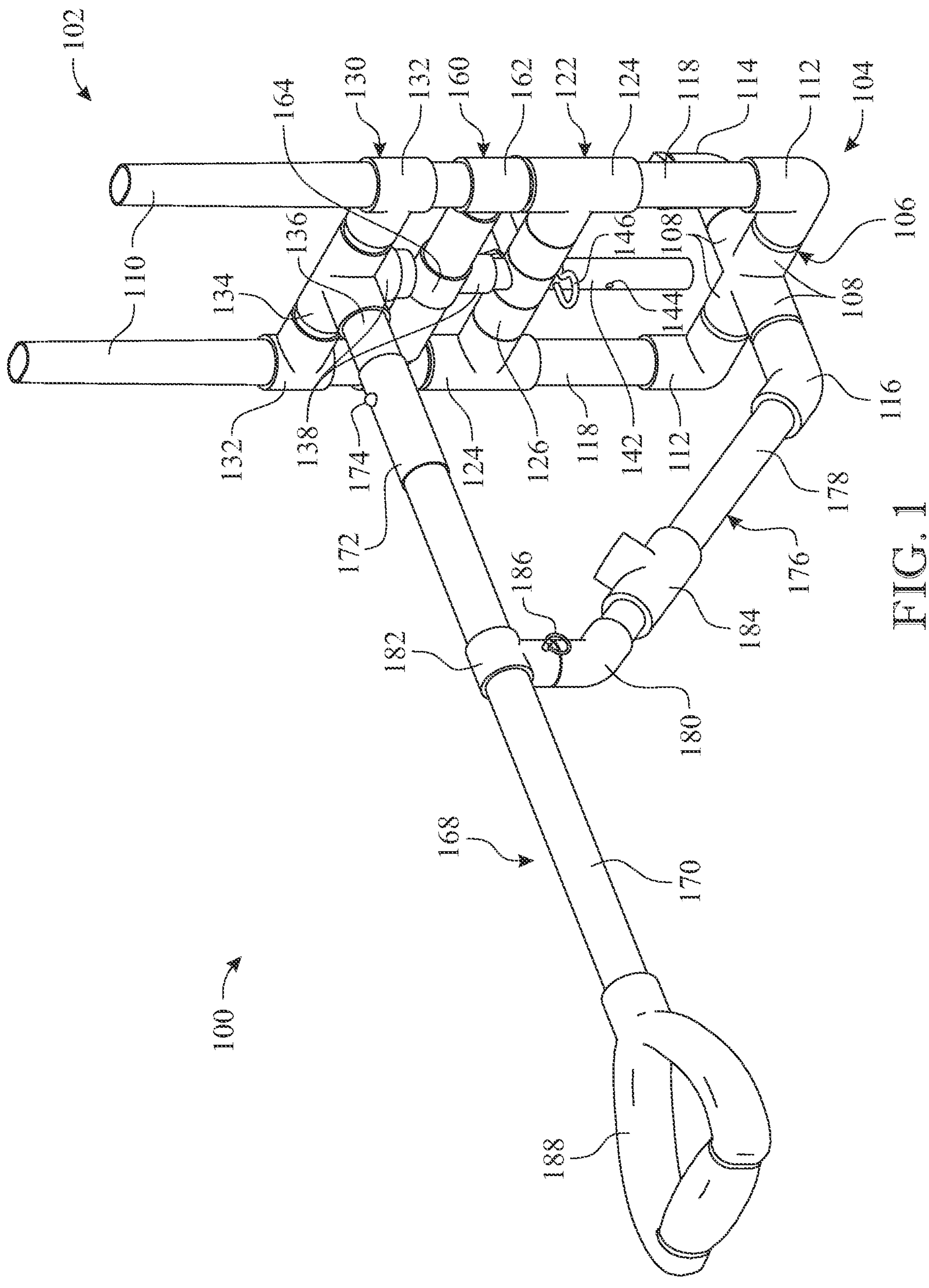
FIG. 1 presents a top front perspective view of a receptacle transport apparatus in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a receptacle transport apparatus which is suitable for enhancing mobility of a trash receptacle, recycling receptacle or other type of receptacle on a surface.

Figure 5:
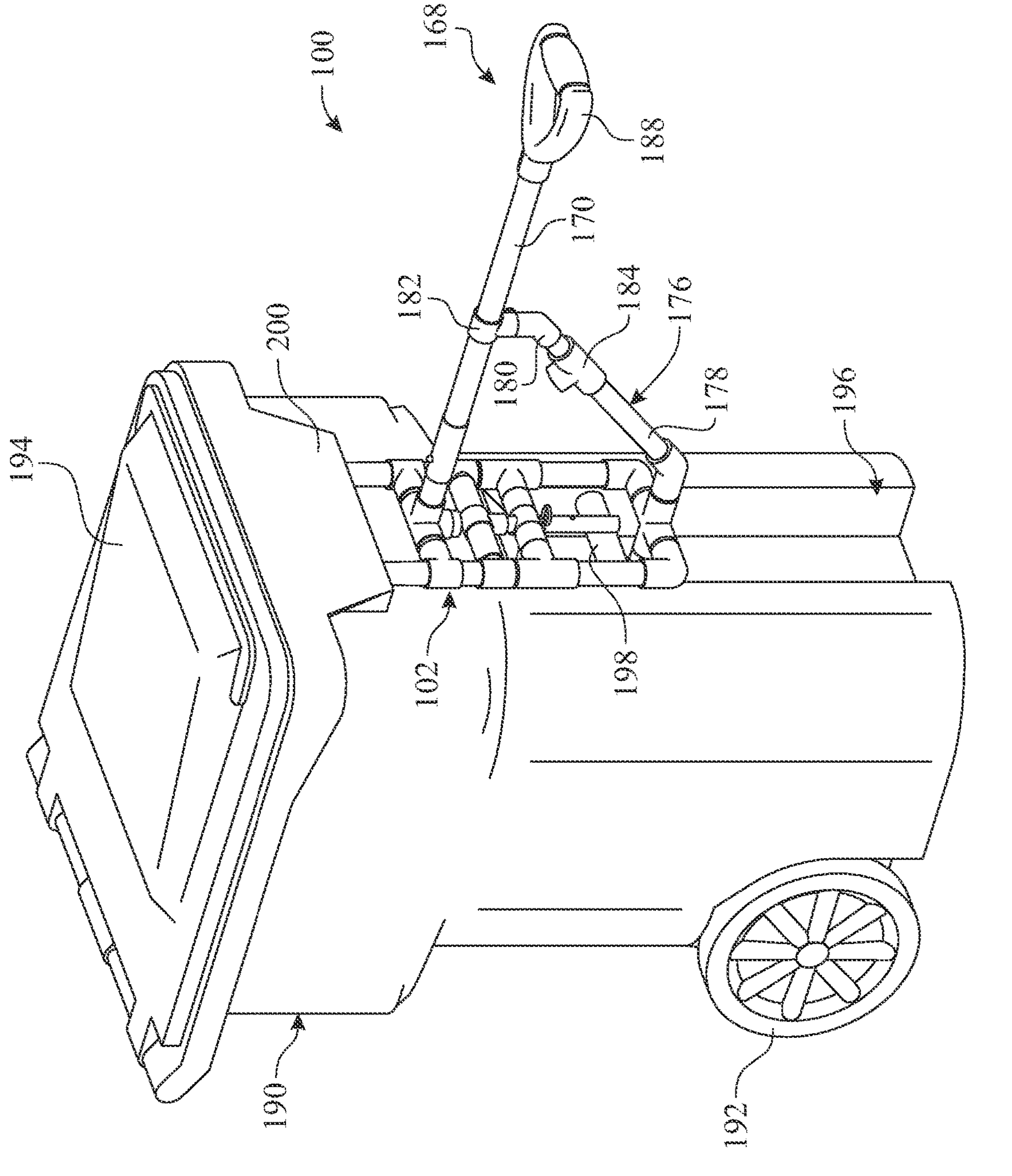
FIG. 5 presents a front perspective view of the receptacle transport apparatus, deployed in place on a receptacle in typical application of the apparatus, with the prong carriage deployed in a raised position on the receptacle engaging frame.
Figure 6:
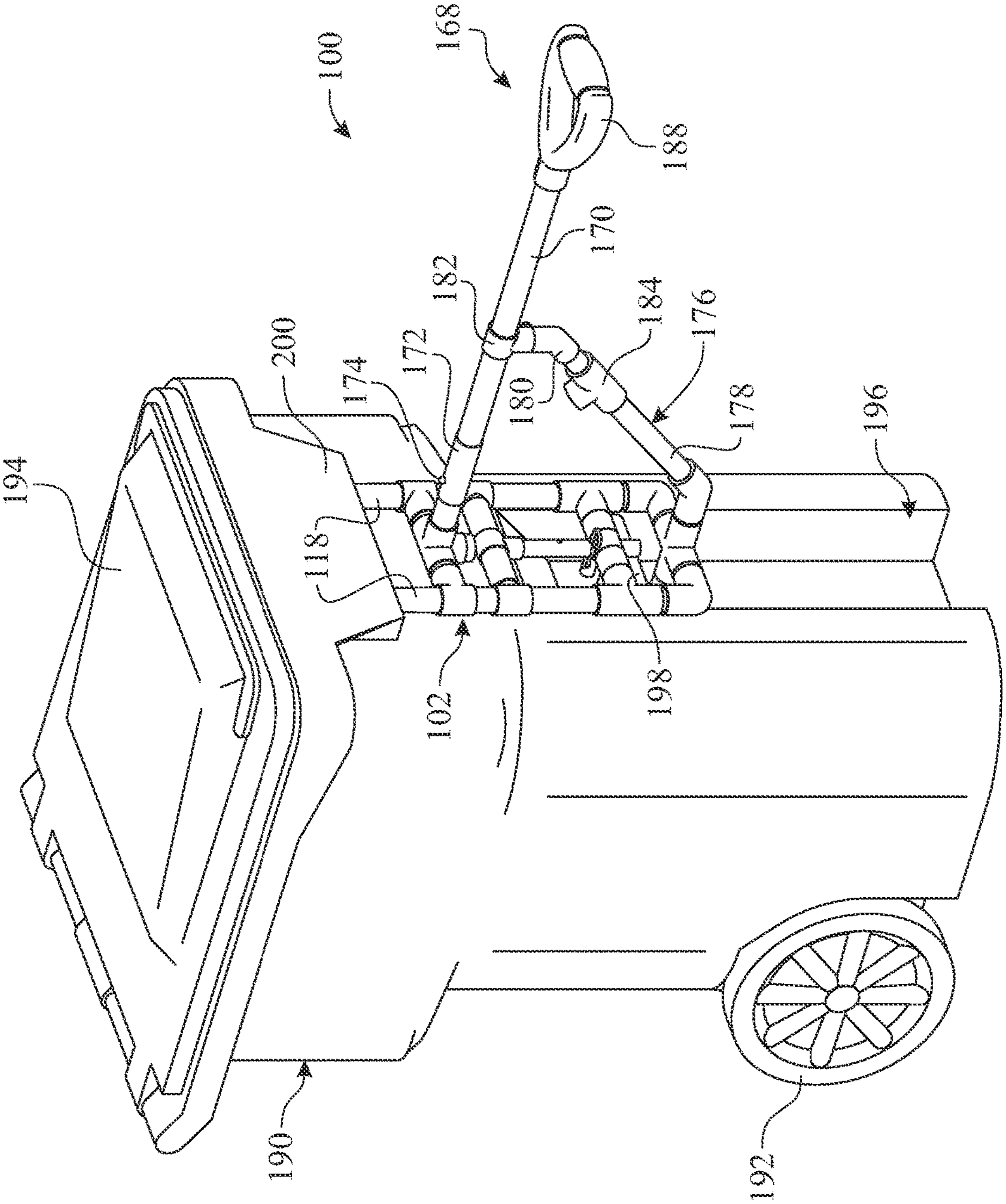
FIG. 6 presents a front perspective view of the receptacle transport apparatus, deployed in place on a receptacle in typical application of the apparatus, with the prong carriage deployed in a lowered position on the receptacle engaging frame.

Referring initially to FIGS. 1-8, a receptacle transport apparatus, hereinafter apparatus 100, is illustrated in accordance with an exemplary embodiment of the present invention. As shown for instance in FIG. 2, the apparatus 100 may include a receptacle engaging frame 102. The receptacle engaging frame 102 may be configured for detachable engagement with the receptacle 190, as illustrated in FIGS. 5 and 6. The receptacle 190 may include a trash receptacle, a recycling receptacle or any other type of receptacle or container which may be large or otherwise difficult to move or transport on a surface.

A handle assembly 168 may extend from the receptacle engaging frame 102. The handle assembly 168 may be graspable by a mover (not illustrated) of the receptacle 190 to enable the mover to push or pull the receptacle 190 along a driveway, street, floor, or other surface (not illustrated). Accordingly, as illustrated in FIGS. 5 and 6 and will be hereinafter further described, in an exemplary application, the receptacle engaging frame 102 can be placed into engagement with the receptacle 190. The handle assembly 168 may extend forwardly from the receptacle engaging frame 102, e.g. in a perpendicular direction therefrom, or ranging up to 25 degrees in either direction from a direct perpendicular thereto. The handle assembly 168 may be grasped by the mover of the receptacle 190 to push or pull the receptacle 190 along the surface. After use, the receptacle engaging frame 102 may be disengaged from the receptacle 190 for storage. The apparatus 100 may be selectively collapsible to facilitate space-efficient storage.

Figure 8:
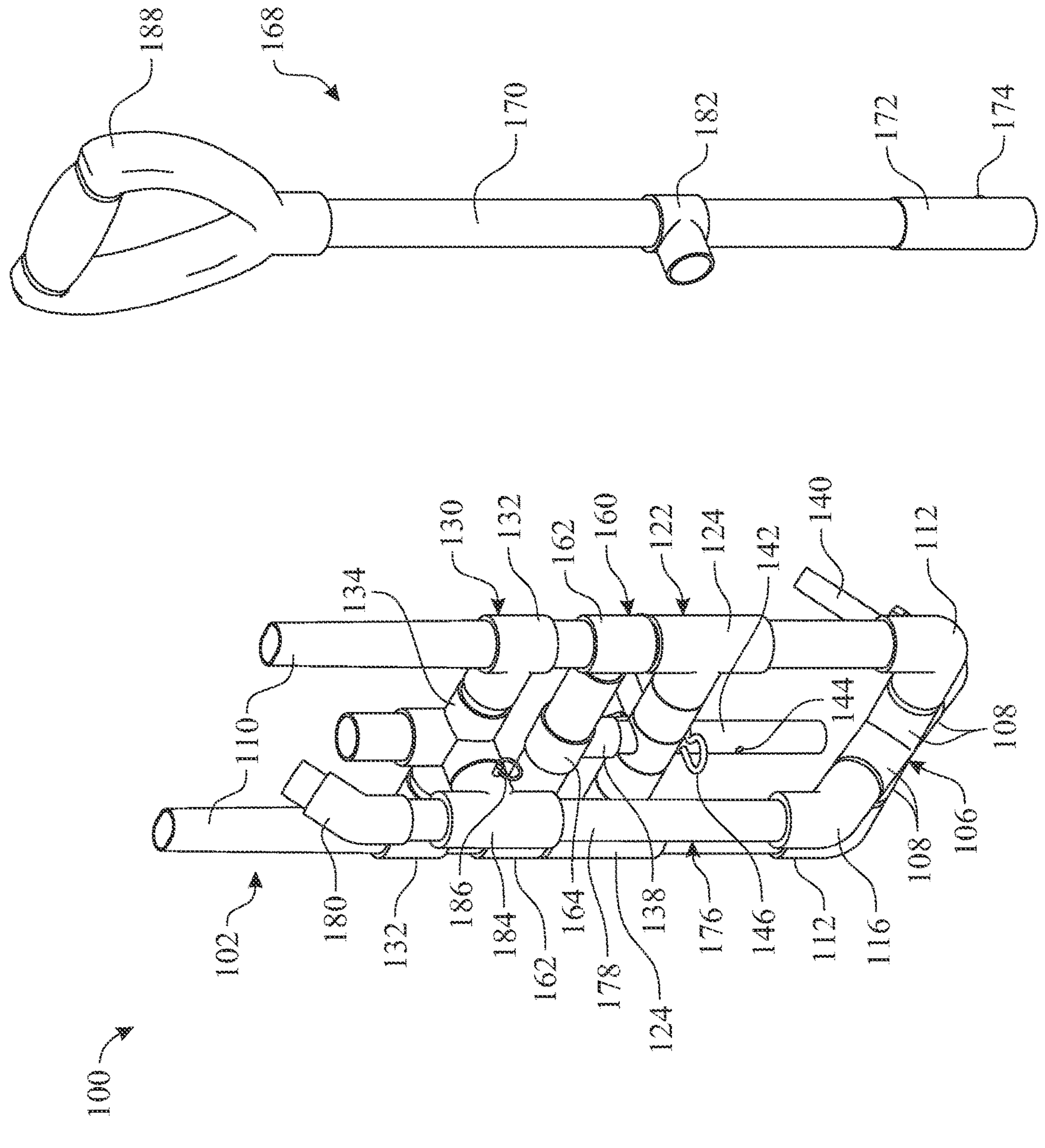
FIG. 8 is a perspective view of the handle assembly removed from the receptacle engaging frame and the arm stabilizer disposed in the collapsed configuration against the receptacle engaging frame for storage of the assembly.

In some embodiments, an arm stabilizer 176 may extend between the receptacle engaging frame 102 and the handle assembly 168 to stabilize the handle assembly 168 with respect to the receptacle engaging frame 102. As illustrated in FIG. 8, after use of the assembly 100, the handle assembly 168 may be removed from the receptacle engaging frame 102. The arm stabilizer 176 may be foldable against the receptacle engaging frame 102 to facilitate space-efficient storage of the apparatus 100.

Figure 2:
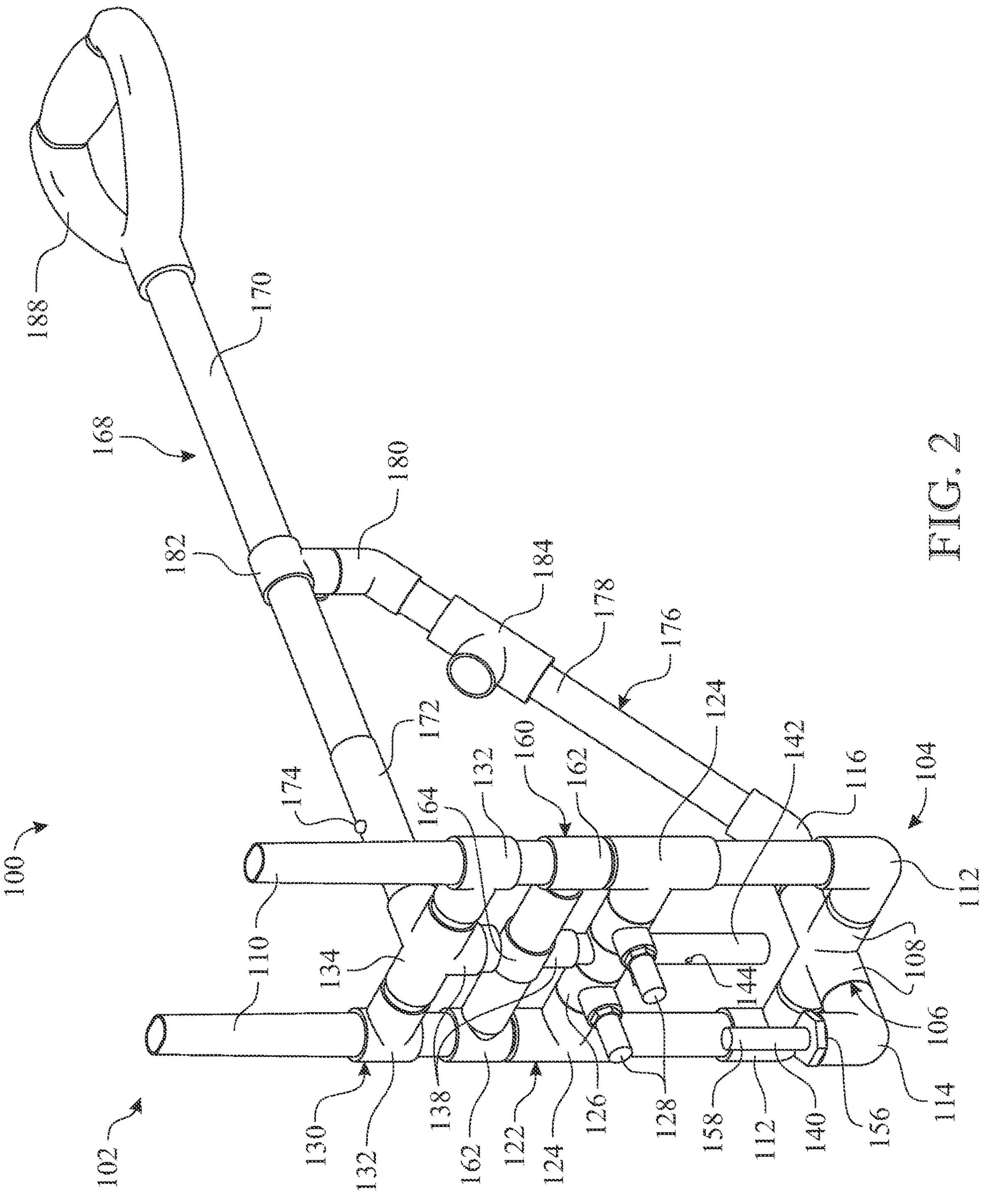
FIG. 2 presents a top rear perspective view of the receptacle transport apparatus illustrated in FIG. 1.
Figure 3:
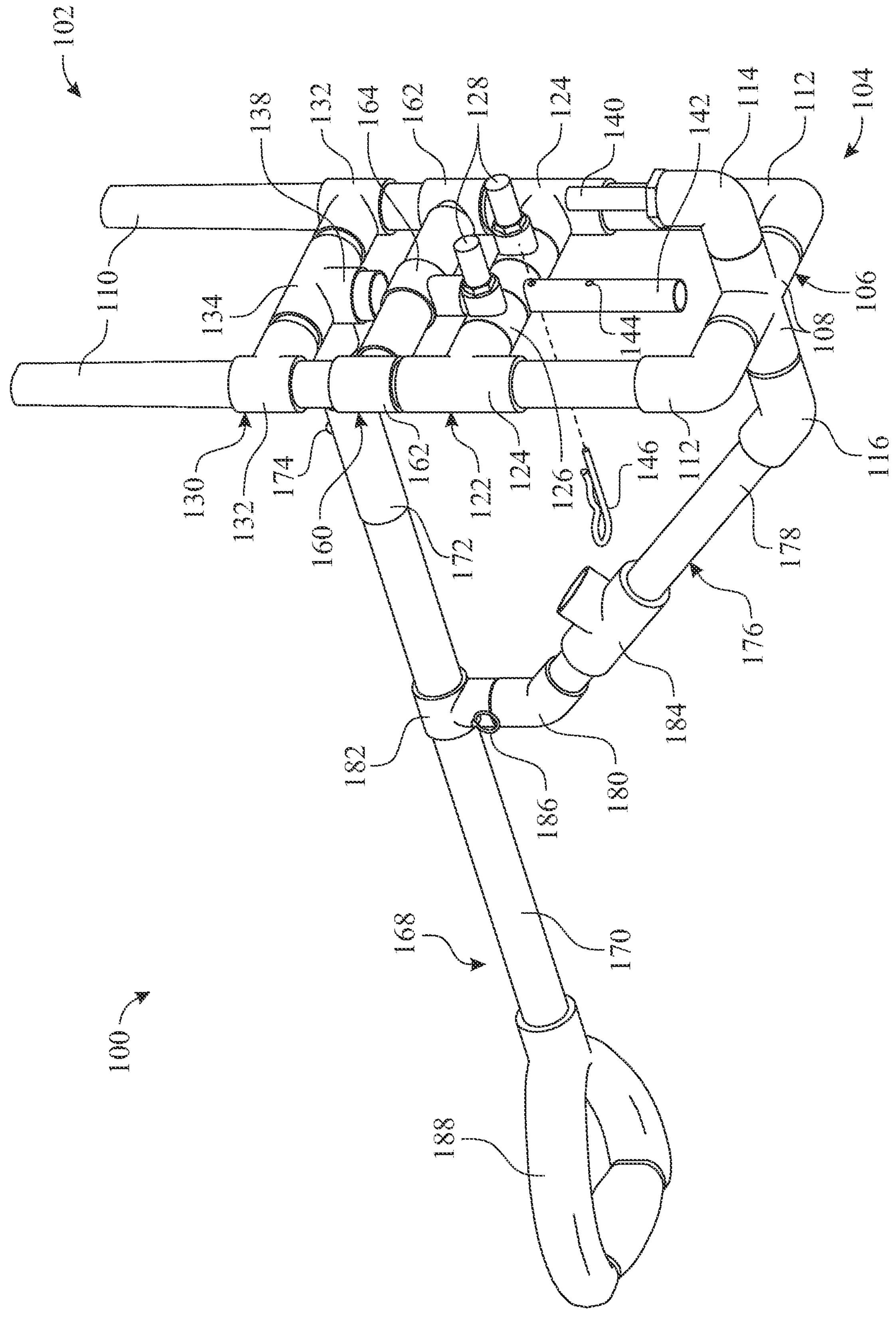
FIG. 3 presents an exploded bottom rear perspective view of the receptacle transport apparatus illustrated in FIG. 1, more particularly illustrating typical securement of the prong carriage with respect to the front receptacle engaging member using a member adjusting pin.
Figure 4:
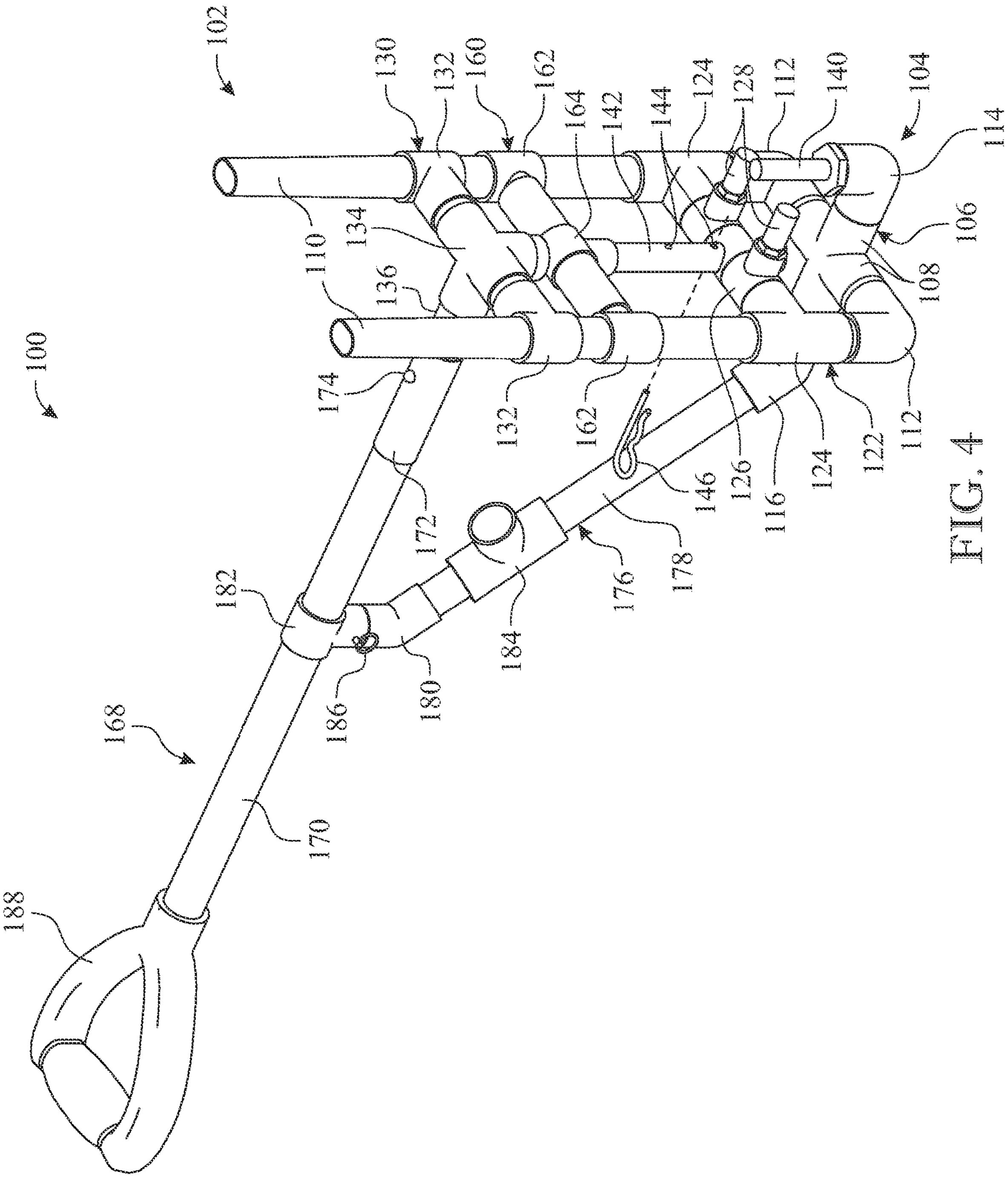
FIG. 4 presents an exploded top rear perspective view of the receptacle transport apparatus illustrated in FIG. 3.

As illustrated in FIGS. 2 and 3, in some embodiments, a rear receptacle engaging member 140 and a front receptacle engaging member 142 may be provided on the receptacle engaging frame 102. The rear receptacle engaging member 140 and the front receptacle engaging member 142 may be configured to engage a receptacle hoisting member 198 (FIGS. 5 and 6) on the receptacle 190, with the rear receptacle engaging member 140 behind and the front receptacle engaging member 142 in front of the receptacle hoisting member 198.

As further illustrated in FIGS. 2 and 3, in some embodiments, the receptacle engaging frame 102 may include at least one receptacle engaging prong 128. The receptacle engaging prong 128 may be configured to engage the receptacle 190. In some embodiments, a pair of spaced-apart receptacle engaging prongs 128 may extend from the receptacle engaging frame 102, as illustrated. In some embodiments, the receptacle engaging prongs 128 may be selectively positioned on the receptacle engaging frame 102 to accommodate receptacles 190 of various types and sizes.

The receptacle engaging frame 102 of the apparatus 100 may include a frame base 104. A pair of parallel, spaced-apart, upstanding side frame members 110 may extend from the frame base 104. A frame arm connector 160 may extend between the side frame members 110. The frame arm connector 160 may include a pair of frame arm connector fittings 162 which receive the respective side frame members 110 of the receptacle engaging frame 102. A frame arm connector member 164 may extend between the frame arm connector fittings 162. The front receptacle engaging member 142 may extend downwardly from the frame arm connector member 164 of the frame arm connector 160.

In some embodiments, the receptacle engaging prongs 128 may be mounted on a prong carriage 122. The prong carriage 122 may be adjustably mounted on the side frame members 110 of the receptacle engaging frame 102. The prong carriage 122 may be mounted between the frame base 104 and the frame arm connector 160.

The prong carriage 122 may include a pair of carriage fittings 124 which receive the respective side frame members 110 of the receptacle engaging frame 102. A carriage member 126 may extend between the carriage fittings 124. The receptacle engaging prongs 128 may extend from the carriage member 126.

An engaging member opening (not numbered) may be provided in the carriage member 126 of the prong carriage 122. The front receptacle engaging member 142 may extend through the engaging member opening. A plurality of pin openings 144 may be provided in the front receptacle engaging member 142. A member adjusting pin 146 may be extended through one of the pin openings 144 in the front receptacle engaging member 142 and through a registering pin opening (not illustrated) in the carriage member 126 of the prong carriage 122 to secure the prong carriage 122 at the desired height or position on the receptacle engaging frame 102.

The rear receptacle engaging member 140 may extend upwardly from the frame base 104 of the receptacle engaging frame 102. The arm stabilizer 176 may be selectively extendable between the handle assembly 168 and the frame base 104 of the receptacle engaging frame 102. In some embodiments, the frame base 104 of the receptacle engaging frame 102 may include a center frame member 106. The side frame members 110 may extend from the center frame member 106 of the frame base 104.

In some embodiments, the center frame member 106 of the frame base 104 may include multiple base member arms 108. The side frame members 110, the rear receptacle engaging member 140 and the arm stabilizer 176 may be attached to the respective base member arms 108 of the center frame member 106.

In some embodiments, a pair of side base member elbows 112 may connect the side frame members 110 to a respective pair of the base member arms 108 of the center frame member 106. Similarly, a rear base member elbow 114 and a front base member elbow 116 may connect the respective rear receptacle engaging member 140 and arm stabilizer 176 to a respective pair of the base member arms 108 of the center frame member 106.

A handle connector 130 may extend between the side frame members 110 of the receptacle engaging frame 102. The handle connector 130 may facilitate attachment of the handle assembly 168 to the receptacle engaging frame 102, typically as will be hereinafter described.

In some embodiments, the handle connector 130 may include a pair of handle connector fittings 132 which receive the respective side frame members 110 of the receptacle engaging frame 102. A tee-shaped handle connecting member 134 may extend between the handle connector fittings 132. The handle assembly 168 may be detachably connectible to the handle connecting member 134.

In some embodiments, the arm stabilizer 176 may be selectively deployable in a functional configuration to support the handle assembly 168 in the extended configuration with respect to the receptacle engaging frame 102, as illustrated in FIGS. 1-4. The handle assembly 168 may be detachable from the receptacle engaging frame 102 and the arm stabilizer 176 may be deployable in a collapsed configuration to fit against the receptacle engaging frame 102 for space-efficient storage of the assembly 100, as illustrated in FIG. 8. Accordingly, the handle connecting member 134 may be rotatably mounted with respect to the handle connector fittings 132 of the handle connector 130. The handle connecting member 134 may be selectively deployable in a functional position to support the handle assembly 168 in the extended configuration with respect to the receptacle engaging frame 102, as illustrated in FIGS. 1-4, and selectively deployable in a folded position to engage and support the arm stabilizer 176 in the collapsed configuration for storage, as illustrated in FIG. 8.

A handle connecting arm 136 may extend from the handle connecting member 134 of the handle connector 130. The handle assembly 168 may be configured to detachably engage the handle connecting arm 136.

In some embodiments, the handle assembly 168 may include an elongated handle assembly arm 170. An arm connector 172 may terminate a proximal end of the handle assembly arm 170. The arm connector 172 may be configured for detachable attachment to the handle connecting arm 136 which extends from the handle connecting member 134 of the handle connector 130. A handle 188 may terminate a distal end of the handle assembly arm 170. A release button 174 may be provided on the arm connector 172. The release button 174 may facilitate selective detachment of the arm connector 172 from the handle connecting arm 136.

In some embodiments, the arm stabilizer 176 may include an elongated stabilizing member 178. A proximal end of the stabilizing member 178 may be connected to the front base member elbow 116 which extends from the corresponding base member arm 108 of the center frame member 106. A distal end of the stabilizing member 178 may be configured for attachment to the handle assembly arm 170 of the handle assembly 168.

A stabilizing member elbow 180 may terminate the distal end of the stabilizing member 178 of the arm stabilizer 176. A stabilizing member connector 182 may be provided on the handle assembly arm 170 of the handle assembly 168. The stabilizing member elbow 180 may be configured for detachable attachment to the stabilizing member connector 182 to facilitate deployment of the arm stabilizer 176 in an extended, functional position to support the handle assembly 168 in an extended configuration with respect to the receptacle engaging frame 102 and in the collapsed configuration for storage. In some embodiments, an arm stabilizer pin 186 may detachably attach the stabilizing member elbow 180 to the stabilizing member connector 182.

In some embodiments, a stabilizing member fitting 184 may be provided on the stabilizing member 178 of the arm stabilizer 176. The stabilizing member fitting 184 may be configured to engage the handle connecting member 134 of the handle connector 130 to secure the arm stabilizer 176 in the collapsed configuration for storage, as illustrated in FIG. 8. The arm stabilizer pin 186 may facilitate attachment of the stabilizing member fitting 184 to the handle connecting member 134 in the collapsed configuration.

Figure 7:
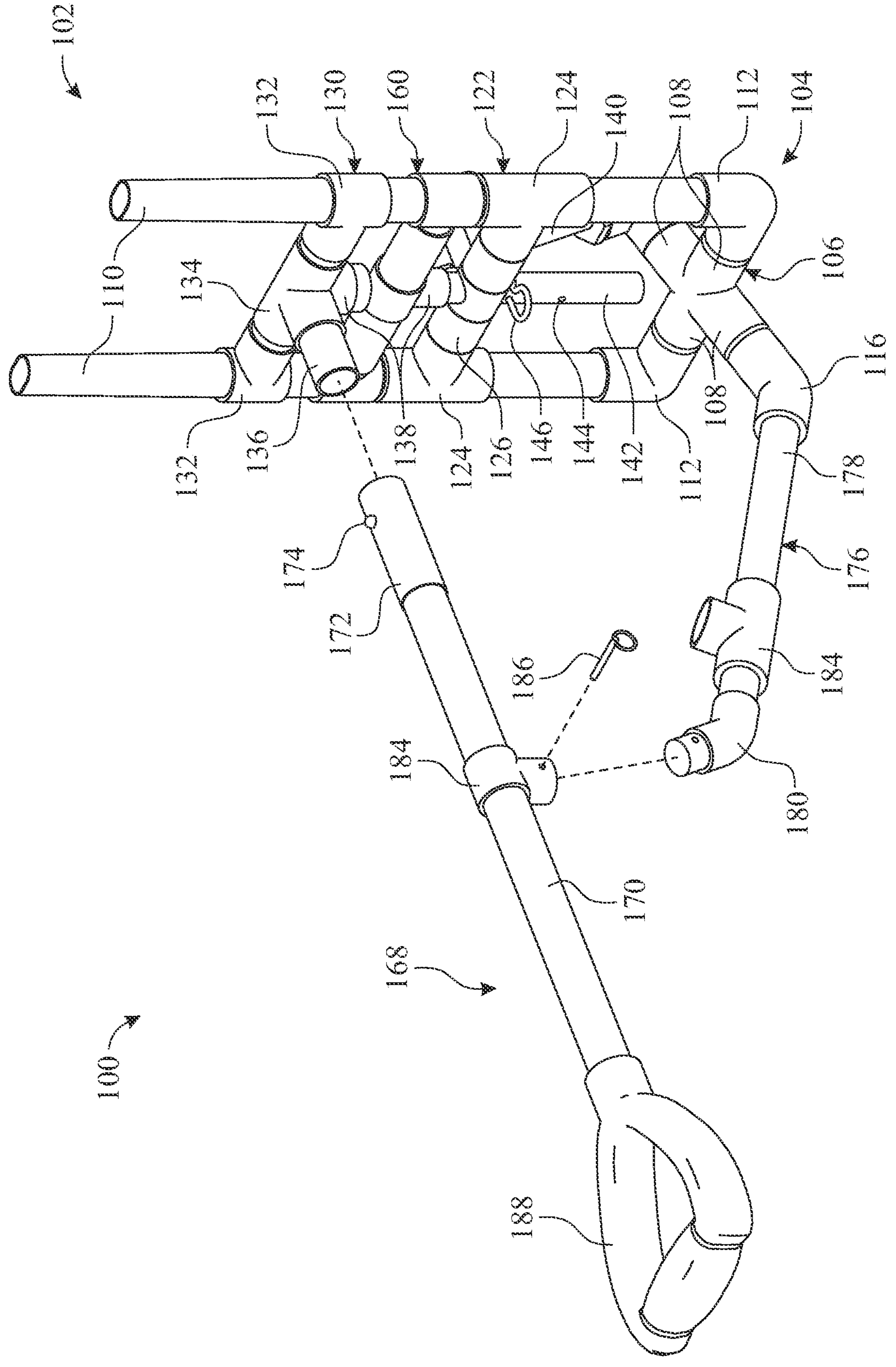
FIG. 7 presents an exploded front perspective view of the receptacle transport apparatus, more particularly illustrating typical attachment of the arm stabilizer to the handle assembly using an arm stabilizer pin.

As illustrated in FIGS. 5-7, in typical application, the apparatus 100 may be placed into engagement with the receptacle 190 to enhance mobility of the receptacle 190 on a driveway, street, floor, or other surface (not illustrated). The receptacle 190 may be a trash receptacle, recycling receptacle or other type of receptacle which is typically large, bulky and difficult to move or maneuver on a surface, particularly when loaded with trash, recyclable material or other material or items. The receptacle 190 may have a conventional design with a pair of receptacle wheels 192 and a hinged or pivoting receptacle lid 194. A front lid flange 200 may extend downwardly from the receptacle lid 194. A vertical gap 196 may extend down the front of the receptacle 190. A horizontal receptacle hoisting member 198 may span the gap 196. The receptacle hoisting member 198 may facilitate engagement of a lift arm (not illustrated) on a trash or recycling transport vehicle with the receptacle 190 in emptying of the contents of the receptacle 190 into the vehicle.

The handle assembly 168 may be attached to the handle connecting member 134 of the handle connector 130 such that the handle assembly 168 extends forwardly from the receptacle engaging frame 102. The arm stabilizer 176 may be deployed between the handle assembly 168 and the receptacle engaging frame 102 to stabilize the handle assembly 168 in the extended, functional position.

The receptacle lid 194 may initially be opened on the receptacle 190. The receptacle engaging frame 102 of the assembly 100 may be placed into engagement with the receptacle 190 by initially placing the receptacle engaging frame 102 in the gap 196 in the receptacle 190. The receptacle engaging frame 102 may then be lowered until the rear receptacle engaging member 140 and the front receptacle engaging member 142 on the receptacle engaging frame 102 are positioned behind and in front of, respectively, the receptacle hoisting member 198, and the carriage member 126 typically rests on the receptacle hoisting member 198. The receptacle engaging prongs 128 on the prong carriage 122 may engage the receptacle 190 to stabilize the apparatus 100 on the receptacle 190. The vertical height or position of the receptacle engaging prongs 128 may be selected by moving the prong carriage 122 vertically on the front receptacle engaging member 142 and the side frame members 110 and secured typically via the member adjusting pin 146. The receptacle lid 194 may be closed on the receptacle 190 with the front lid flange 200 on the receptacle lid 194 typically extending over and in front of the upper portion of the receptacle engaging frame 102. A mover (not illustrated) of the apparatus 100 may grasp the handle 188 of the handle assembly 168 and pull or push the handle 188 to maneuver the receptacle 190 to the desired position on the surface.

After use, the receptacle engaging frame 102 may be disengaged from the receptacle 190. As illustrated in FIG. 8, the handle assembly 168 may be detached from the handle connecting member 134 of the handle connector 130 typically by depressing the release button 174 on the arm connector 172. The arm stabilizer 176 may be detached from the handle assembly 168 typically by removal of the arm stabilizer pin 186 from the registering pin openings in the respective stabilizing member elbow 180 and stabilizing member connector 182. The arm stabilizer 176 may then be deployed in the collapsed configuration to fit against the receptacle engaging frame 102 for space-efficient storage of the assembly 100 by rotating or pivoting the handle connecting member 134 relative to the handle connector fittings 132 of the handle connector 130. The arm stabilizing pin 186 may be deployed to secure the stabilizing member fitting 184 on the arm stabilizer 176 to the handle connecting member 134.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A receptacle transport apparatus suitable for enhancing mobility of a receptacle on a surface, comprising:

a receptacle engaging frame configured for detachable engagement with the receptacle;

a handle assembly extending from the receptacle engaging frame, the handle assembly graspable by a mover of the receptacle to enable the mover to push or pull the receptacle along a surface;

an arm stabilizer extending between the receptacle engaging frame and the handle assembly to stabilize the handle assembly with respect to the receptacle engaging frame; and the handle assembly removable from the receptacle engaging frame and the arm stabilizer selectively deployable in a functional configuration to support the handle assembly in an extended configuration with respect to the receptacle engaging frame and in a collapsed configuration to fit against the receptacle engaging frame for space-efficient storage of the receptacle transport apparatus and wherein the receptacle engaging frame includes a frame base, a pair of parallel, spaced-apart, upstanding side frame members extending from the frame base, and a frame arm connector extending between the side frame members and wherein a release button is provided on the arm connector.

2. The receptacle transport apparatus of claim 1, wherein a rear receptacle engaging member and a front receptacle engaging member are provided on the receptacle engaging frame.

3. The receptacle transport apparatus of claim 1, wherein the receptacle engaging frame includes at least one receptacle engaging prong configured to engage the receptacle.

4. The receptacle transport apparatus of claim 3, wherein the receptacle engaging prong includes a pair of spaced-apart receptacle engaging prongs.

5. The receptacle transport apparatus of claim 4, wherein the receptacle engaging prongs are selectively positioned on the receptacle engaging frame to accommodate receptacles of various types and sizes.

6. The receptacle transport apparatus of claim 1, wherein the frame arm connector includes a pair of frame arm connector fittings which receive the respective side frame members of the receptacle engaging frame and a frame arm connector member extending between the frame arm connector fittings.

7. The receptacle transport apparatus of claim 4, the receptacle engaging prongs are mounted on a prong carriage which is adjustably mounted on the side frame members of the receptacle engaging frame.

8. The receptable transport apparatus of claim 7, wherein the prong carriage is adjustably mounted on the side frame members between the frame base and the frame arm connector.

9. The receptacle transport apparatus of claim 2, wherein, a plurality of pin openings are provided in the front receptacle engaging member.

10. The receptacle transport apparatus of claim 1, wherein the frame base of the receptacle engaging frame includes a center frame member which extends from a center frame member of the frame base.

11. The receptacle transport apparatus of claim 1, wherein a rear receptacle engaging member extends from the frame base.

12. The receptacle transport apparatus of claim 10, wherein the center frame member of the frame base includes multiple base member arms, and a pair of side base member elbows connect the side frame members to a respective pair of the base member arms of the center frame member.

13. The receptacle transport apparatus of claim 12, wherein a rear base member elbow and a front base member elbow may connect the respective rear receptacle engaging member and arm stabilizer to a respective pair of the base member arms of the center frame member.

14. The receptacle transport apparatus of claim 12, wherein a handle connector extends between the side frame members of the receptacle engaging frame.

15. The receptacle transport apparatus of claim 13, wherein a stabilizing member elbow terminates a distal end of a stabilizing member of the arm stabilizer.

16. The receptacle transport apparatus of claim 15, wherein an arm stabilizer pin detachably attaches the stabilizing member elbow to a stabilizing member connector.

17. The receptacle transport apparatus of claim 1, a stabilizing member fitting which is provided on a stabilizing member of the arm stabilizer.

18. The receptacle transport apparatus of claim 17, wherein the stabilizing member fitting is configured to engage a handle connecting member of a handle connector to secure the arm stabilizer in the collapsed configuration for storage.

19. A receptacle transport apparatus suitable for enhancing mobility of a receptacle on a surface, comprising:

a receptacle engaging frame configured for detachable engagement with the receptacle;

a handle assembly extending from the receptacle engaging frame, the handle assembly graspable by a mover of the receptacle to enable the mover to push or pull the receptacle along a surface;

an arm stabilizer extending between the receptacle engaging frame and the handle assembly to stabilize the handle assembly with respect to the receptacle engaging frame; and the handle assembly removable from the receptacle engaging frame and the arm stabilizer selectively deployable in a functional configuration to support the handle assembly in an extended configuration with respect to the receptacle engaging frame and in a collapsed configuration to fit against the receptacle engaging frame for space-efficient storage of the receptacle transport apparatus and wherein the receptacle engaging frame includes a frame base, a pair of parallel, spaced-apart, upstanding side frame members extending from the frame base, and a frame arm connector extending between the side frame members and wherein the frame arm connector includes a pair of frame arm connector fittings which receive the respective side frame members of the receptacle engaging frame and a frame arm connector member extending between the frame arm connector fittings.

20. A receptacle transport apparatus suitable for enhancing mobility of a receptacle on a surface, comprising:

a receptacle engaging frame configured for detachable engagement with the receptacle;

a handle assembly extending from the receptacle engaging frame, the handle assembly graspable by a mover of the receptacle to enable the mover to push or pull the receptacle along a surface;

an arm stabilizer extending between the receptacle engaging frame and the handle assembly to stabilize the handle assembly with respect to the receptacle engaging frame; and the handle assembly removable from the receptacle engaging frame and the arm stabilizer selectively deployable in a functional configuration to support the handle assembly in an extended configuration with respect to the receptacle engaging frame and in a collapsed configuration to fit against the receptacle engaging frame for space-efficient storage of the receptacle transport apparatus and wherein a stabilizing member fitting which is provided on a stabilizing member of the arm stabilizer and wherein the stabilizing member fitting is configured to engage a handle connecting member of a handle connector to secure the arm stabilizer in the collapsed configuration for storage.

* * * * *